United States Patent [19]
Reeds

[11] Patent Number: 5,731,788
[45] Date of Patent: Mar. 24, 1998

[54] GLOBAL POSITIONING AND COMMUNICATIONS SYSTEM AND METHOD FOR RACE AND START LINE MANAGEMENT

[75] Inventor: Kevin McKenzie Reeds, Palo Alto, Calif.

[73] Assignee: Trimble Navigation, Sunnyvale, Calif.

[21] Appl. No.: 848,943

[22] Filed: May 1, 1997

Related U.S. Application Data

[63] Continuation of Ser. No. 371,406, Jan. 11, 1995, abandoned.
[51] Int. Cl.$^6$ .................. G01S 5/02; H04B 7/85; G08B 23/00
[52] U.S. Cl. .................. 342/357; 342/454; 340/323 R
[58] Field of Search .................. 342/357, 454, 342/455, 456, 457; 340/323 R

[56] References Cited

U.S. PATENT DOCUMENTS

| | | | |
|---|---|---|---|
| 3,890,463 | 6/1975 | Ikegami et al. | 340/323 R |
| 5,191,341 | 3/1993 | Gouard et al. | 342/41 |
| 5,202,829 | 4/1993 | Geier | 342/357 |
| 5,307,074 | 4/1994 | Janex | 342/41 |
| 5,317,321 | 5/1994 | Sass | 342/357 |
| 5,422,816 | 6/1995 | Sprague et al. | 342/357 |
| 5,452,262 | 9/1995 | Hagerty | 367/6 |

FOREIGN PATENT DOCUMENTS

| | | | |
|---|---|---|---|
| 0196179 | 8/1986 | Japan | 342/357 |

*Primary Examiner*—Gregory C. Issing
*Attorney, Agent, or Firm*—Robert P. Sabath Law Offices of Robert Sabath

[57] ABSTRACT

A system and method for positioning control and management of racing sailboat positions and velocities includes the strategic placement of global positioning receivers and transmitters at a buoy and committee boat marking the sail race start line, as well as radio and global positioning receivers on the sailboat. Global positioning system (GPS) and radio transmitter units are mounted on a race start buoy and committee boat and another GPS and radio transceiver unit receives GPS signals from positioning satellites and radio signals from the race start buoy and committee boat. The information received by the racing sailboat is processed to determine relative and absolute positions and velocities, and estimated time of arrival (ETA) at the intercept between current sailboat course and the race start line for display in user-friendly race management.

11 Claims, 8 Drawing Sheets

GLOBAL POSITIONING AND COMMUNICATIONS SYSTEM AND METHOD FOR RACE AND START LINE MANAGEMENT

This application is a continuation of application Ser. No. 08/371,406, filed on Jan. 11, 1995, now abandoned.

TECHNICAL FIELD

This invention relates to integrated global positioning system (GPS) communications networks, and particularly to communications and automated global positioning determination of racing vehicle information indications.

BACKGROUND OF THE INVENTION

Racing vehicles, whether they are sailboats at an America's Cup race, or another kind of vehicle engaged in timed competition, are difficult to track. The private observer has difficulties in observing the entire competition, which spoils the enthusiasm and spirit of the race. Further, the race officials managing the competition from a central station or from committee boats have considerable command and control difficulties at the start of the race, during its progress, and at the end of the race, determining which vessel crossed the line when, who violated the racing rules, and who was doing what in protest situations.

The chaos begins with a dash across the start line, and then it continues from mark to mark over the entire race course until the final boat crosses the finish line. Usually the race starts with the first mark upwind. As the raceboats cross the start-line, they may tack at 45 degrees from the start-line, either to port or starboard of the wind direction. If a boat is too close to the starting line, it may choose to drop off the wind or to luff its sails. The proximity of another sailboat which has the right-of-way according to the Rules of the Road may prevent a course change. Unfortunately, luffing the sails with its accompanying loss of speed, cuts the momentum across the start-line, and reduces the likelihood of winning the race. Accordingly, it is advantageous in sail racing, to be able to estimate time of traversal over the start line with great accuracy. With the sailboat traveling on the order of five to ten knots, minor course and speed adjustments can then ensure that the sailboat travels across the start line at just the right moment-not too soon, requiring the sailboat to circle and recross the start-line, and not too late, in effect forfeiting several seconds of valuable race-time.

From the perspective of a committee boat assigned to start the race, and perhaps restart it, if several boat traverse the start line prematurely, the problem is just as difficult. Moreover, committee boats are tasked with monitoring the entire racing fleet as the race progresses, as well as determining the order in which the boats cross the finish line.

Global positioning systems, often referred to as GPS systems are useful in determining the separations between mobile objects and absolute locations of the objects, as well. For example, a local GPS reference receiver (RR) can be employed to eliminate common errors in the GPS navigation solution of other nearby receivers. As is known, GPS systems permit users equipped with suitable receivers to make accurate position, velocity, and time determinations worldwide with reference to GPS satellites (also referred to as satellite vehicles or SV's) which are in 12 hour (19,000 km) orbits about the earth. Such satellites continuously broadcast their identification, position, and time using specially coded signals. The broadcast information unfortunately contains errors composed of the satellite's clock error, errors in the satellite's broadcast ephemeris data, and certain signal propagation delays.

Current global positioning systems are employed primarily to provide information to the receiver of global positioning information from global positioning satellites as to the position of the receiver. While this information may be transmitted to other locations, it is not known to provide estimated times of arrival across a race start line using global positioning techniques or equipment.

It may accordingly be desirable to enable the development of global positioning information which is of use in the correct setting of course and speed of sailboats nearing a race start line. It may additionally be desirable to track the progress of a sailing fleet from selected locations on board a committee boat or ashore, as well as the traversal of individual boats across the finish line.

SUMMARY OF THE INVENTION

The apparatus according to the present invention includes a position control and management system and method for monitoring and controlling boat or vehicle activities at a race start-line, during a race, and at the traversal of the race finish line by using an automated global positioning network to track each boat or vehicle. Further, the system according to an embodiment of the present invention determines actual and anticipated crossing times for boats and vehicles at a race start line or finish line and provides for user friendly display of information indicating anticipated and actual line crossing times, estimated times of arrival (ETA) at a selected line crossing, positions, courses and velocities, and tracks of movement of one or more selected boats or vehicles prior to, during and after a race.

To accomplish position control and management, the communications network according to one embodiment of the present invention includes at least two racing boats, a starting and finishing line buoy and committee boat combination. A communications controller may be located on the start line committee boat, on another committee boat, or the communications system may be automated to operate without a dedicated communications controller. According to one embodiment of the present invention, a communication controller is located at or near the site of a ground based reference station to broadcast or transmit differential corrections to GPS receivers on a selected boat or vehicle. According to one embodiment of the present invention, the communication controller polls individual racing boats or vehicles as to their differentially corrected positions and velocities as a function of time. According to an embodiment of the present invention, the racing boats and the start or finish line buoy and committee boat, are each outfitted with a radio transmitter for transmitting time, position, and velocity in the case of racing boats and selected other vessels such as committee boats under way, and time and position in the case of a buoy or committee boat marking a start or finish line. The position information transmitted can be a differentially corrected position or an uncorrected position, as will be discussed below. Further according to the present invention, a particular boat includes a radio receiver receiving radio transmissions of several kinds, including (1) time and position for a starting or finishing line buoy or committee boat, (2) position, time, and velocity indications from another boat, and (3) polling signals, differential corrections, positions, velocities, times, corrected positions, and corrected velocities, from a communication controller or another boat. The radio transmissions can be provided over simplex or multiplex single or multiple channels. According to one embodiment of the present invention, the boats carry data processing equipment to determine buoy and committee boat positions to establish a formulation of the start line, and to determine successive sailboat positions over a selected time interval to track the course of selected boats incident to movement. According to one embodiment of the present invention, a system and method for global positioning control and management of a sailboat in connection with racing activities includes the strategic placement of global positioning receivers and transmitters on a start and finish-line buoy and a start and finish line committee boat and on a racing sailboat and the intercommunication and display presentation of position and direction information relating to the start-line buoy and committee boat, and the racing sailboat being established on a boat-positioned display to permit the skipper and crew members including but not limited to helmsman, tactician, and navigator to make decisions regarding velocity, tack, and positioning relative the startline, to monitor race progress and, for example, to avoid premature start-line crossage and having to reverse course to recross the startline.

According to one embodiment of the present invention, a system and method for global positioning control and management of a sailboat in connection with racing activities includes the strategic placement of global positioning receivers and transmitters on a start and finish-line buoy and a start and finish line committee boat and on a racing sailboat and the intercommunication and display presentation of position and direction information relating to the start-line buoy and committee boat, and the racing sailboat being established on a display positioned in the sailboat to permit the skipper and crew members to make decisions regarding velocity, tack, and positioning relative the startline, to monitor race progress and, for example, to avoid premature start-line crossage and having to reverse course to recross the startline.

DETAILED DESCRIPTION OF THE PREFERRED EMBODIMENTS

Figure 1:
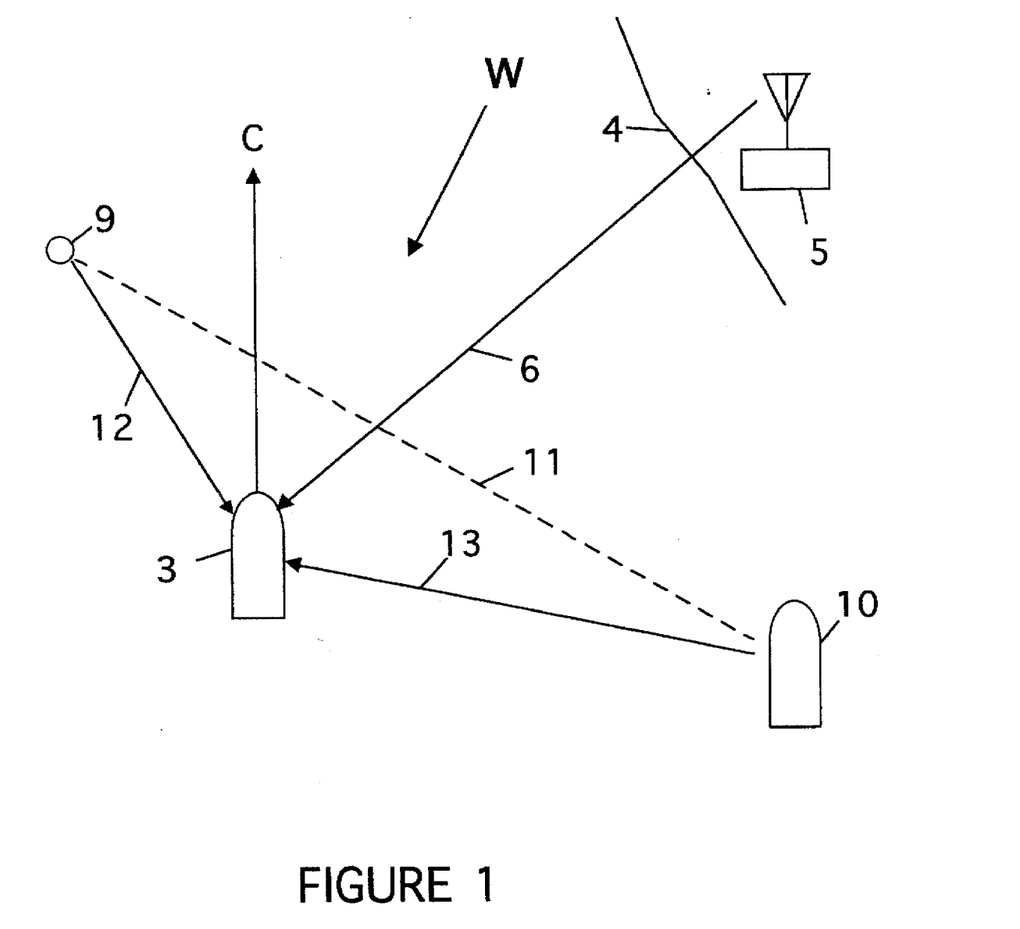
FIG. 1 is a diagram of first and second racing sailboats approaching a starting line defined by first and second start-line buoys anchored in place at preselected locations.

FIG. 1 shows a racing sailboat 3 sailing into the wind (W) on a starboard tack at a distance removed from shoreline 4 near which is located a global positioning system (GPS) reference station 5. Reference station 5 provides differential GPS correction signals 6 to sailboat 3 based upon the difference between its own known position and its position determined by GPS techniques. Additionally shown in FIG. 1 are a race start buoy 9 and a racing committee boat 10 jointly defining a start line 11 for a sailboat race in which sailboat 3 is participating. Both buoy 9 and committee boat 10 and sailboat 8 are in radio communication with each other with respective radio signals 12 and 13, and buoy 9, committee boat 10, and sailboat 3 each have a global positioning system (GPS) mounted thereupon or maintained therein for communicating with global positioning system satellites 15 (shown in FIG. 2) for receiving global positioning signals 16 indicative of pseudoranges with respect to satellites 15.

To accomplish radio communication with sailboat 3 and reception of GPS signals from satellites 15, buoy 9 and committee boat 10 include a transceiver system 20 including a GPS receiver and a radio transmitter disclosed in greater detail below in connection with FIG. 8. Further, sailboat 3 includes a GPS receiver for receiving GPS transmissions and a radio receiver for receiving radio transmissions from buoy 9 and committee boat 10. Conventional radio transmission and reception equipment is employed in connection with the embodiments under the present invention. More particularly, buoy 9 and committee boat 10 transmit information and signals to sailboat 3 with respect to its position and other indications. Buoy 9 and committee boat 10 each have a GPS receiver which receives GPS signals through a suitable antenna. Buoy 9 and committee boat 10 receive GPS signals from a plurality of GPS satellites 15, including first through sixth GPS satellites. At any given time, GPS satellites 15. As long as sailboat 3, committee boat 10, and buoy 9 receive GPS signals from a sufficient number of satellites 15, each can compute its position based upon pseudoranges determined from signals received from satellites 15. Each satellite 15 transmits its identity number, a time signal, predetermined orbital ephemeris corrections, clock errors, drift rates, and other key navigational signals, which are well known and relied upon in the global positioning and navigation arts. A particular GPS receiver establishes the pseudorange to a particular satellite by taking the difference in the time the signal is received using the receiver's own internal clock and the transmitted time and comparing it with the time signal transmitted by the satellite. The receiver's clock error may be large relative to the ranging accuracy required, and for this reason and other inaccuracies, the receiver's ranges so established are termed pseudoranges (PR's). In particular, a pseudorange can be defined as the time of the received signal minus the time of the transmitted signal from a selected satellite, in the GPS receiver's time frame. The receiver time includes the GPS receiver clock offset or error relative to GPS time. In summary, the pseudorange is modeled as being equal to the range to the satellite plus tropospheric and ionospheric delays, plus the receiver clock offset.

According to a preferred version of the present invention, the system described with respect to FIG. 1 is optimized to reduce the amount of information to be transmitted between stations or stored at one of them for later position determination activity. The actual satellite information taken in by each of the stations is the same as in the prior art. The system invented requires the registration of a sufficient plurality of pseudorange and line-of-sight information sets from available global positioning satellite vehicles in orbit above first and second receiving stations having antennae to receive satellite information relevant to global positioning. As in the prior art, each of the information sets includes a predetermined block of information with respect to both the transmitting satellite and the receiving station listening for the information. The information registered may be stored locally or transmitted in raw or modified form to the other of the receiving stations.

Figure 3:
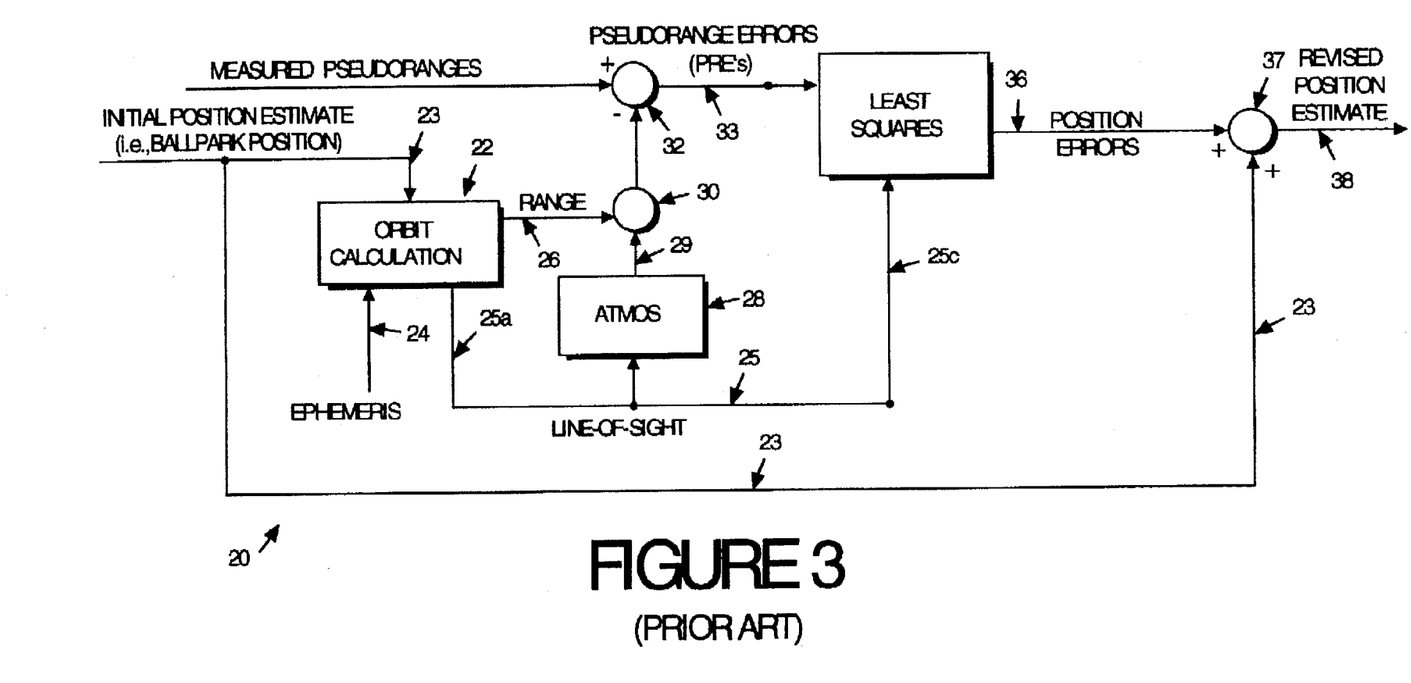
FIG. 3 is a block diagram of a GPS receiver according to the prior art.

FIG. 3 shows a block diagram of a GPS receiver 20 according to the prior art. GPS receiver 20 includes an orbit calculation function 22 based upon a ballpark position input 23, an ephemeris data input 24, and a line-of-sight input 25a from a line-of-sight input source 25. The orbit calculation function 22 produces an output range indication 26. Line-of-sight input source 25 further provides a line-of-sight input 25b to an ATMOS function 28 which produces an ATMOS output indication 29. GPS receiver 20 further includes a summation function 30 which is effective for adding range indication 26 and ATMOS indication 29 to produce a summation output indication 31. GPS receiver 20 further includes a subtraction function 32 which is effective for subtracting the summation output indication 31 from each a plurality of measured pseudorages (PRs). The subtraction function 32 produces a pseudorange error indication 33 for each measured pseudorange, which may collectively be referred to as PR error indications. Line-of-sight input source 25 further provides a line-of-sight input 25c to a least squares function 35. GPS receiver 20 includes least squares function 35, and least squares function 25 receives as inputs, PR error indications 33 and line-of-sight input 25c. Least squares function 25 is effective for producing a position error indication 36 for each of the input measured pseudoranges. According to the prior art, least squares function 25 produces position error indications 36 according to the relationship, $$\text{POS ERROR} = [(H^T H)^{-1} * H^T] * \text{PRE}$$

where POS ERROR is a particular position error vector corresponding to a selected pseudorange error value; PRE is a selected pseudorange error value; H is a matrix of line of sight and time values for "m" lines of sight, the matrix being in m rows and four columns, the first column comprising the x components for all m rows, the second column comprising the y components for all m rows, the third column comprising the z components for all m rows, and the fourth column comprising all 1's; and each row of the matrix comprising x, y, z coordinates for a particular line of sight for the satellite represented by the corresponding element of the PRE vector, and the last element of each row being the number 1, i.e.:

$$H = |X\,Y\,Z\,1| = \begin{vmatrix} x1 & y1 & z1 & 1 \\ x2 & y2 & z2 & 1 \\ & \cdots & & \\ xm & ym & zm & 1 \end{vmatrix}$$

$$\text{PRE} = \begin{vmatrix} PRE_1 \\ PRE_2 \\ \cdot \\ \cdot \\ \cdot \\ PRE_m \end{vmatrix}$$

where m is a selected number of lines of sight greater than or equal to four (4) for purposes of the prior art. GPS receiver 20 further includes a summation function 37 which is effective for adding ballpark (i.e., initial estimated) position indications 23 with corresponding position error indications 36 to produce actual position indications 38, and PREi is the pseudorange associated with the "ith" line of sight.

Figure 2:
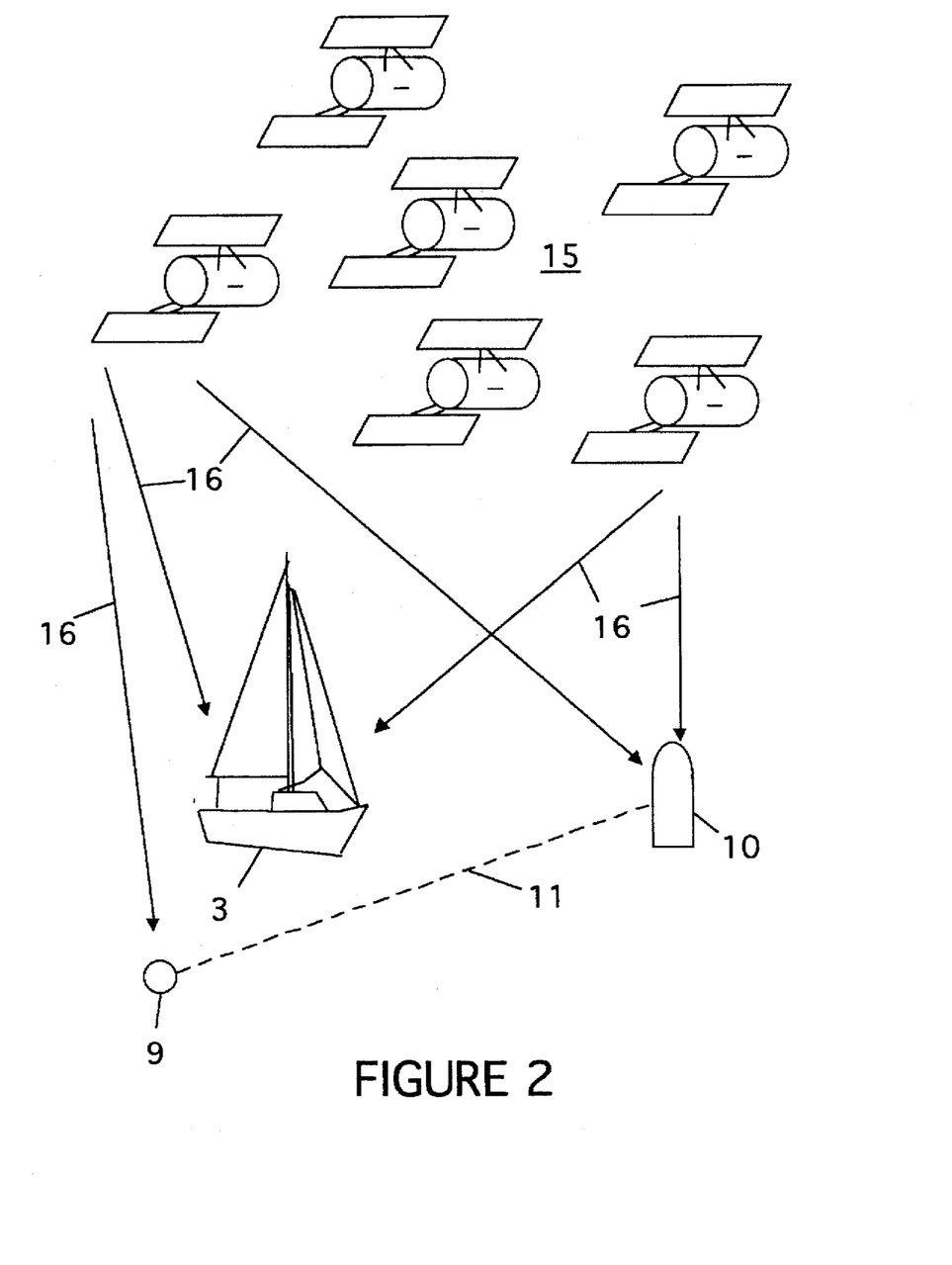
FIG. 2 is a diagram of a first racing sailboat separated from the race start line, each receiving GPS signals from a set of six GPS satellites.

FIG. 2 shows a block diagram of a GPS receiver 20 according to the invention herein, including provision for making a residual calculation. GPS receiver 20 includes an orbit calculation function 22 based upon a ballpark (initial estimated) position input 23, an ephemeris data input 24, and a line-of-sight input 25a from a line-of-sight input source 25. The orbit calculation function 22 produces an output range indication 26. Line-of-sight input source 25 further provides a line-of-sight input 25b to an ATMOS function 28 which produces an ATMOS output indication 29. GPS receiver 20 further includes a summation function 30 which is effective for adding range indication 26 and ATMOS indication 29 to produce a summation output indication 31.

GPS receiver 20 further includes a subtraction function 32 which is effective for subtracting the summation output indication 31 from each a plurality of measured pseudoranges (PRs). The subtraction function 32 produces a pseudorange error indication 33 for each measured pseudorange, which may collectively be referred to as PR error indications. Line-of-sight input source 25 further provides a line-of-sight input 25c to a least squares function 35. GPS receiver 20 includes least squares function 35, and least squares function 25 receives as inputs, PR error indications 33 and line-of-sight input 25c. Least squares function 25 is effective for producing a position error indication 36 for each of the input measured pseudoranges. Thus, according to the system and method of the invention, a pseudorange error value is produced for each satellite observed by a particular receiving station, based upon the pseudorange information as to each such satellite, a ballpark position value, and corresponding lines-of-sight corrected as to applicable ephemeris and atmospheric conditions.

Least squares function 25 produces position error indications 36 according to the function, $$\text{POS ERROR} = G * \text{PRE}$$

where:

POS ERROR is a position error vector including pseudorange error values based upon measured pseudoranges and an initial estimated position (i.e., ballpark position estimate), $$G = (H^T H)^{-1} * H^T,$$

PRE is a vector of pseudorange error values which have been produced,

H is a matrix of line of sight and time values for "m" lines of sight, the matrix being in m rows and four columns, the first column comprising the x coordinates for all m rows, the second column comprising the y coordinates for all m rows, the third column comprising the z coordinates for all m rows, and the fourth column comprising all 1's; and each row of the matrix comprising x, y, z coordinates for a particular line of sight, and the last element of each row being the number 1; and m is a selected number of lines of sight greater than or equal to five (5) for purposes of the invention herein.

According to this method and system, position error indications are produced for each pseudorange error value produced, based upon a least squares operation relying upon corresponding lines-of-sight with respect to the satellites having the indicated pseudorange error values.

GPS receiver 20 further includes a summation function 37 which is effective for adding ballpark position indications 23 with corresponding position error indications 36 to produce actual position indications 38. Accordingly, a position indication is produced for each position error indication produced, based upon a comparison of said position error indications with said ballpark position.

GPS receiver 20 further includes a residual calculation function 40 which receives as inputs pseudorange indications 33, line-of-sight inputs 25d from line-of-sight input source 25, and corresponding position error indications 36. The residual calculation function 40 implements the following relationships:

RESID=PRE–$H$*POS ERROR, and

RESID=$[I-HG]_{m \times m}$*PRE=$K$*PRE where RESID is the residual value vector corresponding to a plurality of pseudoranges and lines of sight for a measured number of satellites, "m", PRE is a vector of pseudorange error values which have been produced, H is a matrix of line of sight and time values for "m" lines of sight, as defined above, POS ERROR is a position error vector corresponding to the pseudorange error values produced and based upon an initial estimated position (i.e., ballpark position estimate), $G=(H^T H)^{-1} * H^T$, and $K=[I-HG]_{m \times m}$.

Thus, RESID=PRE–H*POS ERROR=$(I_{m \times m}-HG)$*PRE=$K_{BIG}$, where $K_{BIG}$ is a large or maximal version of the matrix, K.

As a special case, to develop a modified, i.e., optimized or smallest residual package, we chose a matrix, $K_{SMALL}$, of dimensions (rank x m), where rank is the number of measurements minus four (4), such that:

$KK^T=I_{(rank) \times (rank)}$, and $K(HG)=0$, where K=$K_{SMALL}$.

The values of the modified residuals are equal to K*PRE. H is available from the position calculation performed, as indicated above. In particular, H is an m×n matrix, where, for example, n=4, the number of receiver states (i.e., position and time, with position being stated in three dimensions) and m is the number of satellite measurements made. Accordingly, in one case:

$KK^T=I_{(m-n) \times (m-n)}$, and $KH(H^T H)^{-1} H^T=0$, or according to the well-known Gram-Schmidt decomposition:

$KH=0_{(m-n) \times (n)}$.

Thus, both residual values and modified residual values are produced based upon corresponding ones of said pseudorange errors, position error indications, and lines-of-sight, for each of said pseudorange error values produced. According to the invention, a minimized transmission effective for permitting an accurate position determination commensurate with the actual transmission of all measured pseudoranges is accomplished by transmission of a simple position having three components, x, y, and z, and the vector:

$K_{[(m-n) \times m]}$ * (PSEUDORANGE ERROR)$_{(m \times 1)}$=(MEASURED PR–COMPUTED BALLPARK RANGES).

The dimensions of the vector transmitted are: [(m–n)×1]. Accordingly, for six satellite measurements made, a single position and two residual values are all that needs to be transmitted, according to the invention.

Figure 4:
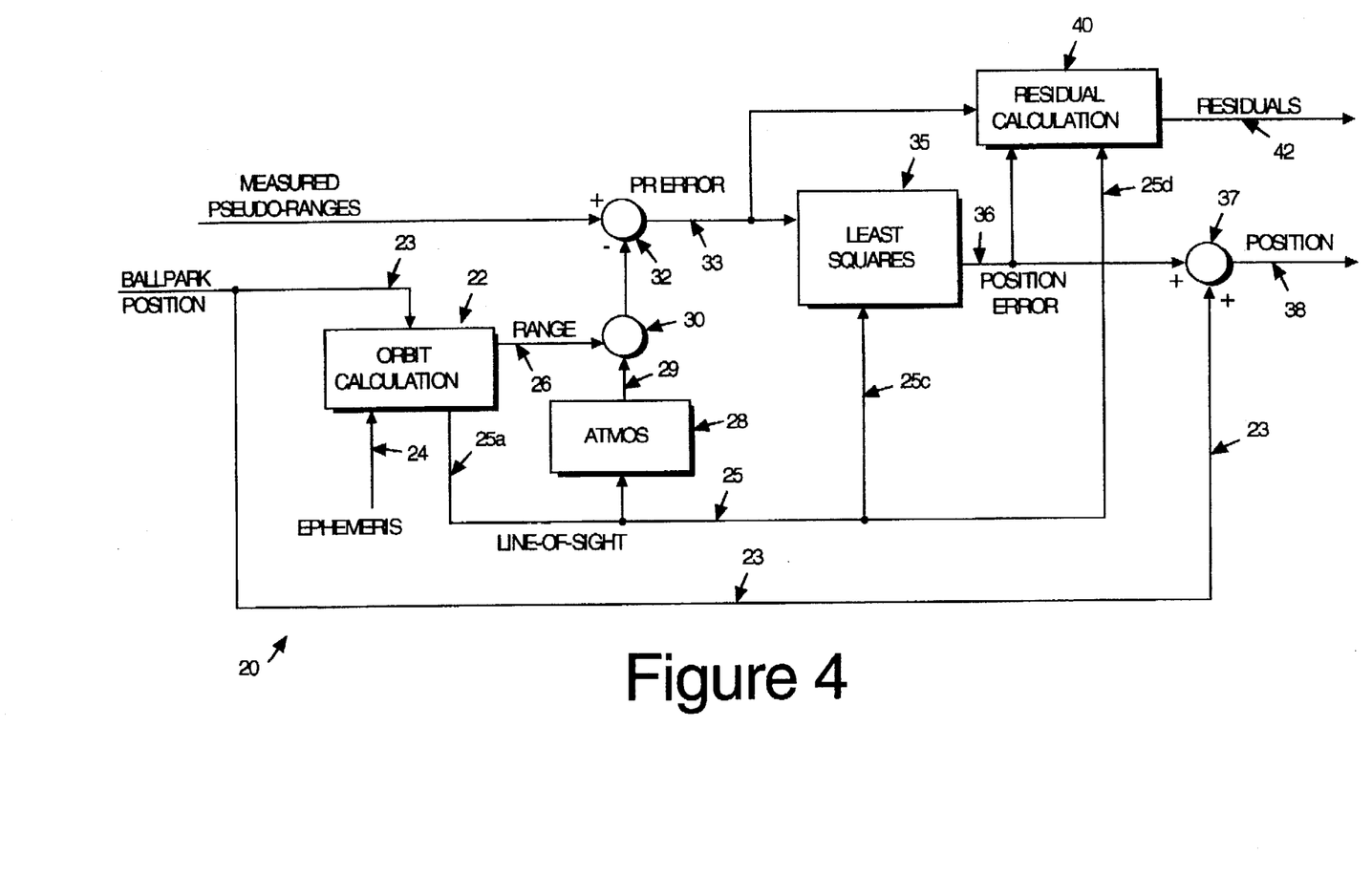
FIG. 4 is a block diagram of a GPS receiver according to the invention herein, including provision for making a residual calculation.

FIG. 4 shows a block diagram of a GPS receiver according to the invention herein, wherein the residual determination is accomplished as part of a least squares calculation. As already noted:

POS ERROR=$G$*PRE, where $G=(H^T H)^{-1} * H^T$, for an ordinary least squares operation. The matrix G is also known as the least squares gain matrix. Alternatively, $G=(H^T R^{-1} H)^{-1} * H^T R^{-1}$, for a weighted least squares operation, wherein R is a weighting matrix for the measurements typically equal to the a priori measurement error covariance matrix. Further, RESID=PRE–H*POS ERROR=$(I_{m \times m}-HG)$ * PRE=K * PRE. Consequently, the two relationships, POSERROR=G, PRE and RESID=K * PRE apply and can be expressed in matrix form to permit the position values and residual values to be determined in an integrated operation. This matrix can be expressed as follows:

$$\begin{vmatrix} POS\,ERROR \\ RESID \end{vmatrix} = \begin{vmatrix} G \\ K \end{vmatrix} * \begin{vmatrix} PRE_1 \\ \cdot \\ \cdot \\ \cdot \\ PRE_m \end{vmatrix}$$

In the matrix equation set forth, G, K, and PRE are known. Accordingly, POS ERROR and PRE are determinable in solving the relationship. Once POS ERROR has been determined, the three estimated position coordinates to be transmitted or stored are available, along with the residual value or values provided. If five satellites have contributed to development of pseudoranges at a particular mobile station, then three position values, i.e., x, y, and z coordinates, are provided with a single residual value with respect to the initial estimated position. For larger numbers of satellites, additional residual values are capable of being provided, in accordance with the expression "m–4." Simply stated, the number of residuals which can be provided is the number of satellites "m" less 4. Thus, for six satellites, there will be two residuals; for seven satellites, there will be three residuals, and so on. The position information and the residuals can be transmitted immediately to sailboat 7 from buoys 9 and 10 along radio signal 14, as shown in FIGS. 1 and 2.

The invention further comprises storing into a selected memory the information which would alternatively be transmitted to sailboat 7. Local storage could be accomplished within the actual GPS receiver or in an on-board computer. Alternatively, a separate computing device or system could be externally connected to accomplish the same result.

The invention includes additionally determining linear combinations of the acquired residual values. One such linear combination of the residual values can be obtained by subtracting one of the residuals from all the other residuals and then simply storing or transmitting the resultant residuals. This could be accomplished by multiplying the residuals by the following matrix:

$$K_{(m-1) \cdot m} = \begin{vmatrix} -1 & 1 & 0 & 0 & 0 \\ -1 & 0 & 1 & 0 & 0 \\ -1 & 0 & 0 & 1 & 0 \\ -1 & 0 & 0 & 0 & 1 \end{vmatrix}$$

Multiplying the residuals by matrix K would result in a reduced linear combination of the residual values which could be transmitted or stored in lieu of the actual residual values produced.

To summarize, the information transmitted to the base station (or stored at the mobile GPS receiving station) includes three position components (x,y,z), at least two (but typically six or more) residuals, and a clock component. In the case of two residuals, one clock component, and three position components, six pseudoranges can be reconstructed. The pseudoranges reconstructed will be relative pseudoranges offset relative to the original pseudoranges. Simply stated, the pseudoranges reconstructed at the base station will be offset from the original pseudoranges developed at the mobile GPS receiving station by a clock component.

Figure 6:
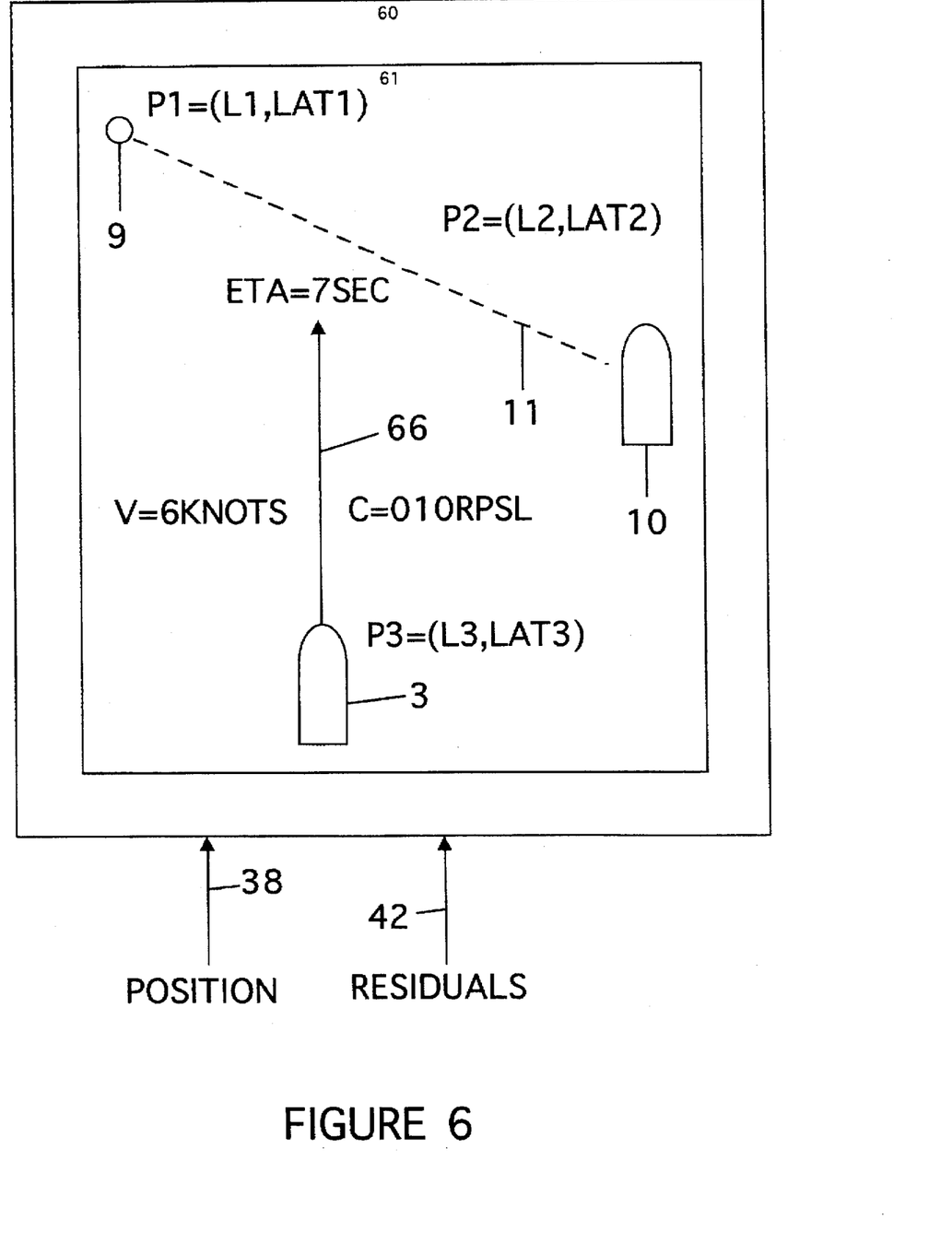
FIG. 6 is a schematic representation of a display console including a data processing unit coupled to a display responsive to input position and residual indications determinative of the location of a sailboat in the vicinity of a racing start-line.

FIG. 6 shows a schematic representation of a display console including a data processing unit 60 coupled to a display 61 responsive to input position (or velocity) and residual indications as to the locations of sailboat 3 or GPS receivers and radio transmitters on buoy 9 and committee boat 10. As shown on display 61, sailboat 3 and committee boat 10 are indicated as boat icons with rounded bows and elongated sides. A circular icon represents buoy 9. According to one embodiment of the present invention, at the beginning of a race start sequence (e.g., ten minutes before the start), a start gun is fired and a flag or shape is raised on a committee boat. The same or another gun is fired with five minutes to go before the start of the race. During the start sequence, the racing boats will compete for optimal position with respect to the remaining boat, with the intent of traversing the start line just as the race start gun goes off. With fleets of up to sixty boats starting, it is difficult if not impossible for the race committee to identify a particular boat that was over the start line early. If several boats are over early, the race committee may sound a general recall rather than guess which boats were over early. Boat that had a good start then lose the advantage, and boats in violation thereby get another chance. According to one embodiment of the present invention, the starting process is automated with GPS receivers, as discussed in detail below, and can include visual alterations of icons representing sailboats 3 involved in the racing. Such visible alterations of the icons can include display colors or gray scale patterns or highlighting effects. For example, according to one embodiment of the present invention, sailboat icons can all be provided with a green hue, if outside the starting line; a yellow hue, if across the line prior to race start; and a red hue if across the start line at t=0, the time at which the race officially starts. This provides a convenient user-friendly indication of which sailboats must recross the start line before continuing to race. Because the race committee can track all of the racing boats individually, the level of chaos at the beginning of the race is manageable, and the race committee is less likely to announce a general recall. Because some races are media events in which delays are costly, and national television schedules may be upset, there are significant advantages in being able to ensure time race starts. Further according to one embodiment of the present invention, times and locations of crossing the finish line for each racing boat are registered, displayed, and printed, with adjustments for handicaps.

Figure 5:
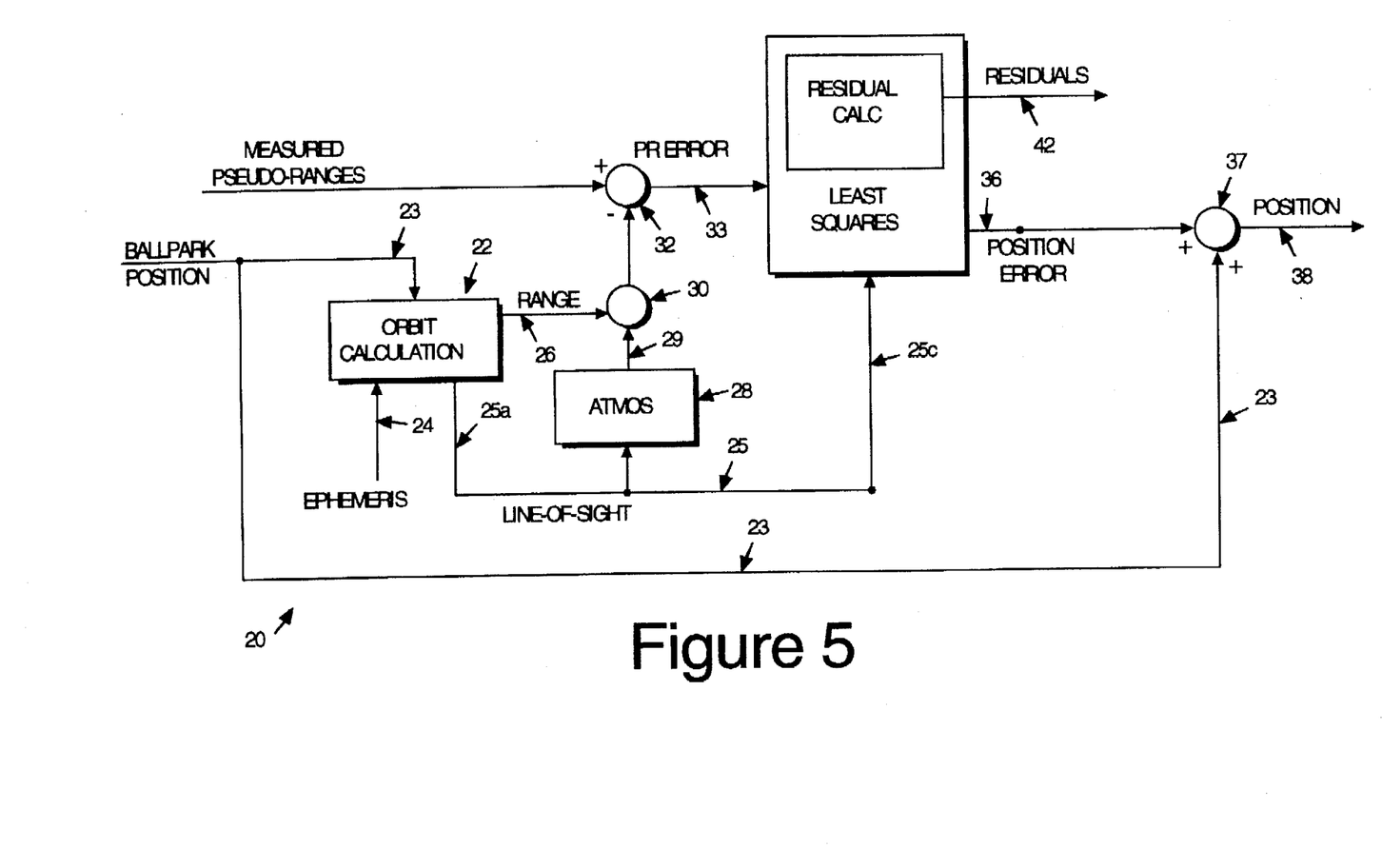
FIG. 5 is a block diagram of a GPS receiver according to the invention herein, wherein the residual calculation is accomplished as part of a least squares calculation.

The information provided to data processing unit 60 and display 61 in FIG. 6 is provided by radio transmission according to one embodiment of the present invention. Alternative transmission and communication methods, such as IR, spread spectrum, or cellular telephone communication can be employed. The input position indications, i.e., as represented by the signal "POSITION," shown, for example in FIGS. 4 and 5, are indicative of current position 38 of a sailboat 3 relative to either buoy 9 or committee boat 10. In lieu of a POSITION input, a velocity input, or a position error input, are provided under alternative embodiments of the present invention. The input residual indications, i.e., as represented by the signal "RESIDUALS," shown, for example in FIGS. 4 and 5, are indicative of current residuals 42 of sailboat 3 or either buoy 9 or committee boat 10. The data processing unit 60 can be an independent microprocessor or part of another data processing system which conducts GPS calculations or other processing operations. The position and residuals information received by data processing unit 60 produces indications such as position indications for sailboat 3, buoy 9, committee boat 10, (these being indicated as x,y coordinates or in terms of longitude and latitude) the race start line 11, a historical track indication (not shown, but implementable as the track of prior positions of sailboat 3), a current velocity vector 66 indicating course and speed, i.e., direction of progress in the indicated direction, and an estimated time of arrival (ETA) at the intercept between the course of sailboat 3 and the race start line 11. As shown in FIG. 6, the positions of sailboat 3, buoy 9, and committee boat 10 can be affirmatively represented by numbers or equations on display 61 next to icons representing respectively sailboat 3, buoy 9, and committee boat 10. In the equation format, the position of buoy 9 can be represented as position 1, or P1=(L1,LAT1). The position of committee boat 10 can be represented at position 2, or P2=(L2,LAT2). The position of sailboat 3 can be represented as position 3, or P3=(L3,LAT3). The icons representing buoy 9 and committee boat 10 can be connected by a dashed line indicating the race start line 11 therebetween. Velocity vector 66 is displayed on display 61 which may be a conventional cathode ray tube (CRT) or liquid crystal display (LCD) or any of a number of currently used display types. Thus, by viewing the display, the skipper, navigator, or strategist on-board sailboat 3 (or all of them) are provided with a symbolic status representation including essential stationing information with regard to sailboat 3, buoy 9, committee boat 10, and start line 11. The skipper may accordingly produce change of station or velocity instructions to the crew to ensure timely crossing of start line 11. Vector 66 can be programmed to indicate either current velocity and direction with respect to either buoy 9 or committee boat 10 or to the closest point of approach between buoy 9 and committee boat 10. As shown in FIG. 6, the icon for sailboat 3 has attached at its foremost tip velocity vector 66 as an indication of the current course of sailboat 3, which can be derived either directly from signals produced in compass 124 to be discussed below or by comparing immediately preceding position indications for sailboat 3. The length of vector 66 on display 61 is indicative of the position the boat will be at some time in the future (i.e., at t=0 when the race starts) and is based upon velocity and course, for user-friendly indication to the skipper or other crew member of sailboat 3 as the magnitudes of these indications. In particular, course and velocity are shown as equations, wherein the velocity is indicated as V=6 KNOTS, i.e., the velocity is equal to six (6) nautical miles per hour. Similarly, course is indicated by the equation, course, or C=010RPSL, or course equals 010 degrees relative to the perpendicular to the start line (SL). Further, between the arrow of vector 66 and the start line 11 is an equation indication that the estimated time of arrival (ETA) at the intercept between current course and the start line 11 equals seven (7) seconds, or ETA=7 SEC. These user-friendly indications on a suitable display, either on a stand-alone display unit on the bridge of sailboat 3 or on a hand-held, personal digital assistant (PDA) can be useful for user-friendly sailing decision making, either by crew or captain.

For determination of distance to crossing a start line, y=m1x+b1, the point of intersection of two lines y=m1x+b1 (the start line) and y=m2x+b2 (the present course of sailboat 3) is calculated for xc and yc, the coordinates of the point of crossing. Knowing the present coordinates, xp and yp, the distance can be calculated as:

$$D = \sqrt{(yc-yp)^2 + (xc-xp)^2}$$

where:

D is distance to the start line;

yc is the y coordinate of the point of crossing;

yp is the y coordinate of the present location of sailboat 3;

xc is the x coordinate of the point of crossing; and xp is the x coordinate of the present location of sailboat 3;

To determine time to cross the startline at the given course provided by one of the indicated line, t*v=D, or t=D/v, a calculation performed by the data processing features of the present invention. At the time of the race start countdown, with 10 seconds to go before crossing is allowed, the calculated time should not be less than 10. If it is less than ten, the skipper can luff the sails, or fall off the wind, as in his or her judgment would be preferable or prudent. By having this critical timing information to a given crossing, erroneous and premature crossings are avoidable, making ultimate racing success more probable.

Figure 7:
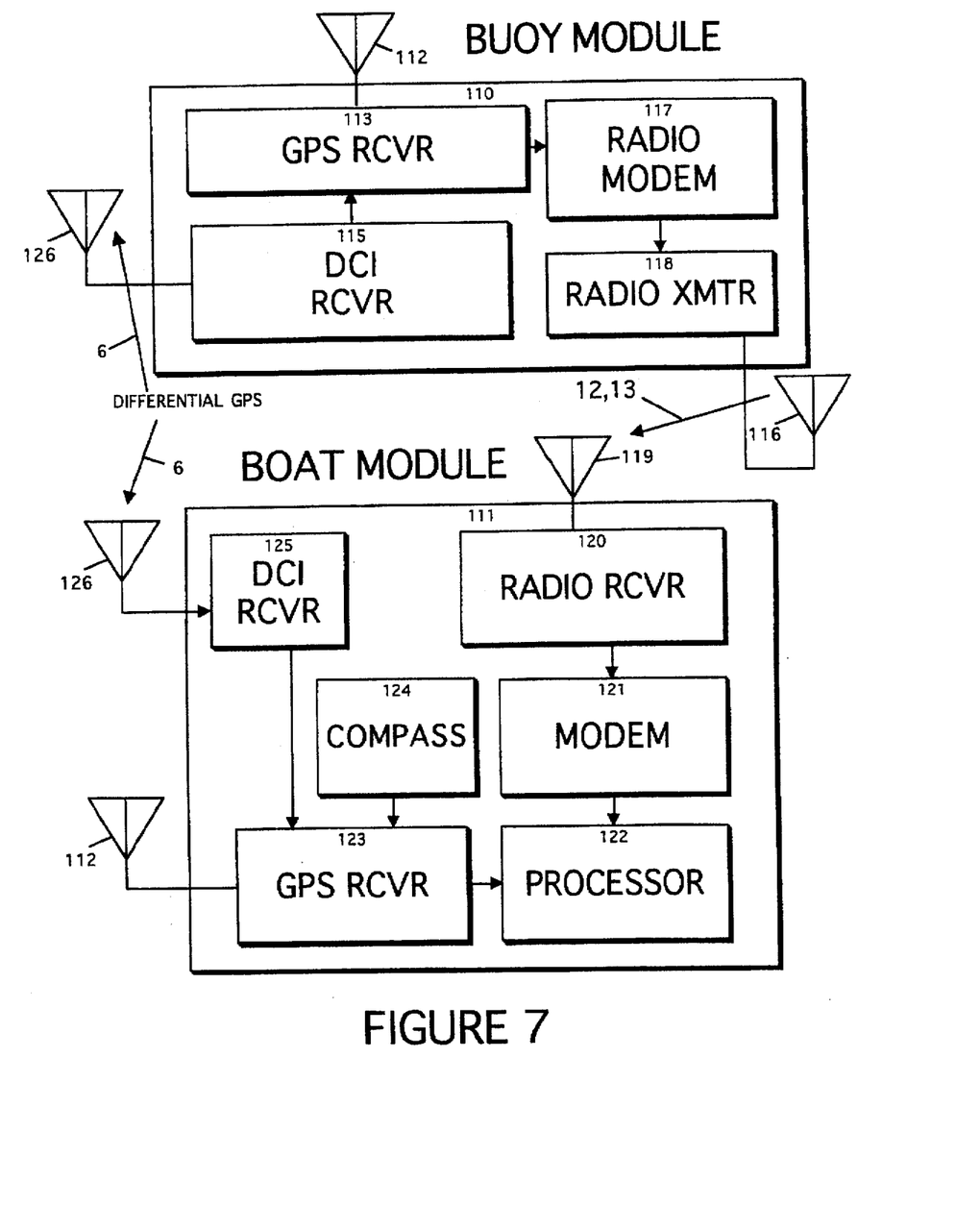
FIG. 7 is a block diagram of the electronics architecture of a communications system according to another embodiment of the present system.

FIG. 7 shows the electronics architecture of a communications system according to one embodiment of the present invention. In particular, FIG. 7 shows first and second electronics modules 110 and 111 which are in communication with each other by radio signals 12 or 13. According to one embodiment, module 110 is the buoy module which is mounted on start line buoy 9 (and/or start line committee-boat 10), and module 111 is the boat module which is on board (whether mounted or loosely held) a racing boat or vehicle, such as sailboat 3. Thus, according to the invention, a pair of first electronics modules 110 can be operative, one positioned upon buoy 9 and the other mounted or held on committee boat 10. Each of first electronics module 110 transmits a corresponding signal 12, 13. Each of first electronic modules 110 includes a GPS antenna 112, a GPS receiver 113, a differential GPS (i.e., DGPS) receiver 115, a radio antenna 116, a radio modem 117, a radio transmitter 118, and a DGPS antenna 126. GPS antenna 112 is connected to GPS receiver 113 for receiving GPS signal information. The DGPS receiver 115 is optional and represents only one possible embodiment of the present invention. When included DGPS receiver 115 receives differential GPS correction signals from antenna 126. GPS receiver 113 is further connected to compass 114 to receive heading information. GPS receiver 113 further is connected to DGPS receiver 115 to receive differential correction information. GPS receiver 113 makes a position or velocity determination, based upon GPS signals received, and information received from DGPS receiver 115. The position or velocity determination made by GPS receiver 113 is provided through radio modem 117 to radio transmitter 118 for transmission of position or velocity information. Radio antenna 116, according to one embodiment of the present invention, is used to transmit radio signals 12, 13. Radio antenna 116, according to one embodiment of the present invention, is an 450 MHz mobile radio antenna from Antenex. Radio modem 117, according to one embodiment of the present invention, is an MRM 48G5 mobile radio modem manufactured by Data Radio of Atlanta, Ga. Radio transmitter 118, according to one embodiment of the present invention, is a K44BNF1001 RNET 450 radio transmitter. Second electronics module 111 includes a GPS antenna 112, radio antenna 119, a radio receiver 120, a modem 121, a data processing unit 122, a GPS receiver 123, a compass 124, a DGPS receiver 125, and a DGPS antenna 126. GPS receiver 113 is connected electrically to radio transmitter 118 through radio modem 117. GPS receiver 123 is connected electrically to data processing unit 122 as well as to DGPS receiver 125 and compass 124. DGPS receiver 125 in turn is connected to antenna 112. Compass 124 is used to determine course accurately, in lieu of obtaining course from successive GPS positions which may be subject to current, wind, and heading inaccuracies. Compass 124, according to an embodiment of the present invention, is a System C100SE10 flux gate compass manufactured by KVH Industries, Inc., of Middletown, R.I. DGPS receiver 125 is a differential correction receiver manufactured by DCI of Cupertino, Calif. As indicated in FIG. 7, radio signals 12, 13 are transmitted by radio transmitter 118 to antenna 119 from which it is transmitted through radio receiver 120 to modem 121. Modem 121 is accordingly provided with GPS information from GPS receiver 113 for demodulation. Further, data processing unit 122 receives GPS information from both GPS receiver 123 and radio receiver 120. First electronics module 110 can be mounted or otherwise positioned or fastened on buoy 9 or committee boat 10. Second electronic module 111 can be mounted or held in hand on sailboat 3 for example which is provided with a suitable display for indicating to a viewer the information processed by data processing unit 122. Data processing unit 122 can be connected to monitor 65 in order to display position or velocity indications received from one or more first modules 110 and position or velocity indication generated from within second module 111.

Figure 8:
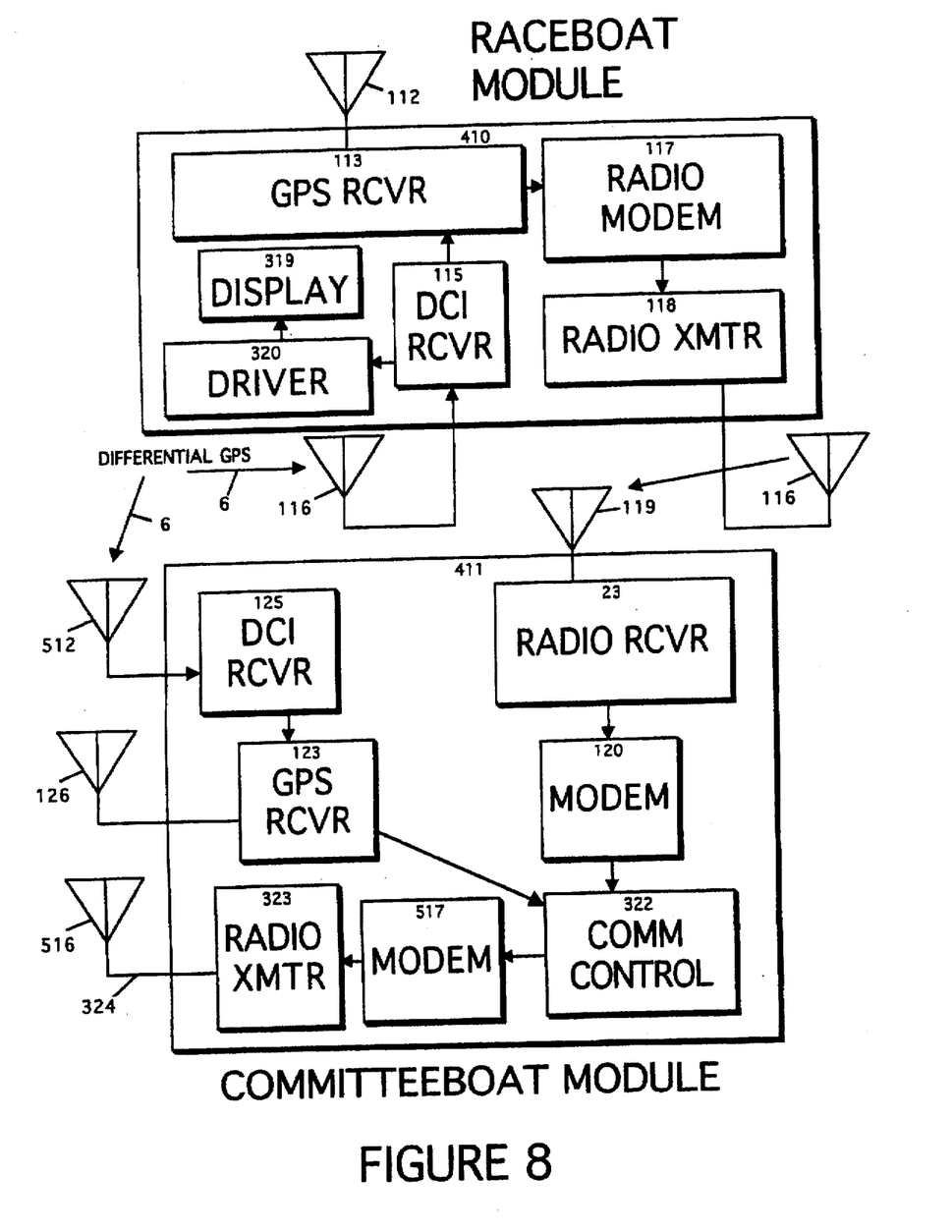
FIG. 8 is a block diagram of the electronics architecture of a communication system according to an embodiment of the present invention including a communication controller.

FIG. 8 is a block diagram of the electronics architecture of a communication system according to an embodiment of the present invention including a communication controller 322 including data processing functions, a radio transmitter 323, and a connection line 324 from radio transmitter 323 to antenna 126. In particular, FIG. 8 shows first and second electronics modules 410 and 411 which are in communication with each other with radio signals from antenna 116 received by antenna 119. According to one embodiment, module 410 is a raceboat module which is mounted or held on boat 3 and module 411 is a committeeboat module which is on board a committeeboat associated with racing done by sailboat 3. According to the present invention, second electronics modules 411 are positioned on boats desiring to receive information about race vehicles and boats including committee boats with regard to position, velocity, time, course traversed, and relationship to start and finish lines. On the other hand to produce and transmit such information, module 410 is positioned upon selected racing boats, committee boats, and selected other vessels or vehicles, as well as buoy 9 and the other module 411 being either mounted or hand-held on committee boat 10. The versions of module 410 which are mounted on buoy 9 are primitive versions of module 410, as there will be no one on buoy 9, in the general case, to make use of a display, for example. A buoy mounted one of first electronics modules 410 transmits signals 12 and another one, mounted either on another buoy or on a committee boat to mark a start or finish line transmits signals 13. According to one embodiment of the present invention, each of first electronic modules 410 includes a GPS antenna 112, a GPS receiver 113, a receiver 115 for general purposes and for receiving differential correction indications, radio antennas 116 (for receiving and sending radio signals), a radio modem 117, a radio transmitter 118, a display 319, and a display driver 320. GPS antenna 112 is connected to GPS receiver 113 for receiving GPS signal information. GPS receiver 113 may further be connected to a compass (not shown) to receive heading information. GPS receiver 113 further is connected to DGPS receiver 115 to receive differential correction information. GPS receiver 113 makes a position or velocity determination, based upon GPS signals received, and information received from receiver 115. The position or velocity determination made by GPS receiver 113 is provided through radio modem 117 to radio transmitter 118 for transmission of position or velocity information. Radio antenna 116, according to one embodiment of the present invention, is used to receive differential GPS signals 6 as well as to transmit radio signals. Receiver 116 includes a differential correction receiver manufactured by DCI of Cupertino, Calif. Radio antenna 116, according to one embodiment of the present invention, is an 450 MHz mobile radio antenna from Antenex. Radio modem 117, according to one embodiment of the present invention, is an MRM 48G5 mobile radio modem manufactured by Data Radio of Atlanta, Ga. Radio transmitter 118, according to one embodiment of the present invention, is a K44BNF1001 RNET 450 radio transmitter. Second electronics module 411 includes a radio antenna 119, radio receiver 23, a modem 120, a communication controller 322 including a data processing capability, a GPS receiver 123, a DGPS (i.e., DCI) receiver 125, an antenna 126, an antenna 512, and an antenna 512. GPS receiver 123 is connected electrically to communication controller 322 as well as to DGPS (i.e., DCI) receiver 125. DGPS receiver 125 in turn is connected to antenna 512. DGPS receiver 125 is a differential connection receiver manufactured by DCI of Cupertino, Calif. As indicated in FIG. 8, radio signals are transmitted by radio transmitter 116 to antenna 119 from which it is transmitted through radio receiver 23 to modem 120. Radio receiver 23 is accordingly provided with GPS information from GPS receiver 113. Further, communication controller 322 receives GPS information from both GPS receiver 123 and modem 120. First electronics module 410 can be mounted on buoy 9 or on a sailboat, committee boat, vessel or vehicle. Second electronic module 411 can be mounted in a sailboat 7 or committee boat or at a fixed ground location at or near a reference station of known location.

According to one embodiment of the present invention, communication controller 322 is positioned at reference station 5 which is a known location from which a differential correction can be determined. In this case, DGPS receiver 125 of second module 411 is replaced by a data input source such as a keyboard by which the actual location of reference station 5, determined by survey for example, in provided to GPS receiver 123. GPS receiver 123 then calculates differential range corrections for each satellite relied upon in position and velocity determination for the reference site. According to this embodiment of the present invention, communication controller 322 broadcasts differential correction information to boats capable of receiving a differential correction indication and determining corrected position and velocity indications as a function of time. Communication controller 322 then polls selected boats or vehicles singly or successively, awaiting return information as to all or some of position and velocity and time associated with position and velocity.

In the case of each of the embodiments noted or suggested herein, differential GPS corrections can be applied according to techniques well-known in the art, to improve the absolute accuracy of the position information determined. As is well known, differential GPS corrections can be obtained by use of a reference station 5 as shown in FIG. 1, which is positioned at a known location. When reference station 5 makes a GPS measurement which deviates from its known location value, the difference between known and measured values constitutes a correction which can be applied in the GPS calculations of other GPS receivers within several hundred miles of the reference station. According to one embodiment of the present invention, referring to a GPS measurement shall include reference to a differentially corrected GPS measurement.

What is claimed is:

1. A method of race management with a committee boat having race management equipment and a display connected to said race management equipment, for monitoring a plurality of racing vehicles on a selected race course, each of the racing vehicles carrying a GPS receiver converting satellite signals to racing indications of at least time and position for the racing vehicle in which it is carried, and communication equipment in each racing vehicle connected to its corresponding GPS receiver, comprising:

placing first and second substantially stationary self-position determining elements having corresponding first and second global positioning system (GPS) receivers installed thereon, said first and second self-position determining elements selected from the group consisting of buoys and boats in predetermined spatial configuration to each other, to define at least one of a starting line and a finishing line, said first and second GPS receivers each capable of self-position determination to provide position information indicating the respective positions of said first and second GPS receivers based upon respectively received GPS satellite transmissions;

transmitting a polling signal requesting racing information for selected racing vehicles;

communicating the requested racing information to said race management equipment in response to said polling signal;

communicating the position information of said first and second substantially stationary self-position determining elements to a committee boat in response to said polling signal;

collecting the communicated racing information as to selected racing vehicles;

collecting the communicated position information from said stationary self-position determining elements;

storing the racing information and position information in a computer memory;

retrieving the racing and position information from the computer memory for presentation of said racing information and said position information pursuant to calculations to provide automatic, updated integrated relative position information, said calculation comprising the steps of:

calculating relative positions of racing vehicles, buoys, and the committee boat from the racing and position information retrieved from the computer memory to establish relative distances between racing vehicles, buoys, and the committee boat, calculating the relative position of at least one of a starting line and a finish line, calculating distance to and time of arrival of a selected racing vehicle to a start line or a finish line based upon present position to provide relative position and timing information;

transmitting the relative position and timing information to a display; and displaying icons representing selected racing vehicles on said display as a function of position and time, permitting race management control.

2. The method according to claim 1 including modifying the appearance of selected display icons as a function of status with respect to race course features.

3. The method according to claim 1 in which the icon of a racing vehicle has a first selected appearance unless it is prematurely across the start line.

4. The method according to claim 1 wherein an icon representing a racing vehicle indicates whether it is across the start line at the time a race is started.

5. A marine-based system for assisting in boat racing across a predetermined start line or finish line defined by a start line or finish line buoy and a committee boat, said system comprising:

first and second global positioning system (GPS) receivers for installation on a selected buoy and a committee boat respectively, said selected buoy and committee boat defining at least one of a start line and a finish line, said first and second GPS receivers each capable of self-position determination to produce position information indicating the respective positions of said first and second GPS receivers based upon respectively received GPS satellite transmissions, said position information comprising a set of position components, at least two residual values, and a clock component;

first and second transmitter radio modems respectively connected to said first and second GPS receivers, for respectively converting positioning information produced by respective ones of said first and second GPS receivers into radio signal transmittable form;

first and second transmitter antennas;

first and second radio transmitters connected to respective ones of said first and second GPS transmitter radio modems, said first and second radio transmitters respectively connected to said first and second transmitter antennas, and configured automatically to broadcast at preselected times received radio transmittable positioning indications of the positions of said first and second GPS receivers to provide repeatedly updated position indications for each of said first and Second GPS receivers;

at least a single, third global positioning system (GPS) receiver for respective installation on each of at least one sailboat, said third GPS receiver being capable of producing global positioning indications of the position of said third GPS receiver based upon received GPS satellite transmissions;

a receiver antenna disposed on each of said sailboats having installed thereon a respective one of said at least a single third GPS receiver for receiving said automatic, repeatedly updated positioning indications of the respective positions of said first and second GPS receivers from respective ones of said first and second radio transmitters;

a radio receiver connected to said receiver antenna for receiving said automatic, repeatedly updated positioning information of the positions of said first and second GPS receivers from said receiver antenna;

a receiver modem connected to said radio receiver;

a data processor connected to said third GPS receiver and said radio modem, said data processor calculating relative position information from said position information, and integrating said relative position information from said first, second and third GPS receivers to calculate for display at least one of a start line and a finish line based upon the relative positions of said buoy and said committee boat, for providing real-time race relevant factors by comparing said start line or finish line with positioning indications from said at least a single third GPS receiver.

6. The system of claim 5, further comprising a compass connected to said third GPS receiver for providing course information.

7. The system of claim 5, wherein said data processing unit is connected to said radio receiver for selectively receiving positioning indications from said second and first radio transmitters, said positioning indications being selected from a group of positioning indications including position indications, position correction indications, velocity indications, velocity correction indications, or pseudoranges.

8. The system of claim 5, further comprising a display coupled to said data processing unit for showing the relative velocities of said buoy and said committee boat.

9. The system of claim 5, further comprising first, second, and third differential correction receivers, said first differential correction receiver being connected to said first GPS receiver, said second differential correction receiver being connected to said second GPS receiver, said third differential correction receiver being connected to said third GPS receiver, for receiving differential GPS indications, each of said first, second, and third differential correction receivers receiving a differential correction indication from a positioning system reference station, said differential correction indication being used to make corrections in the positioning indications produced by said first, second, and third GPS receivers to make them more accurately reflective of the actual positions at which said first, second, and third GPS receivers are located.

10. A marine-based position management system for a sailboat with respect to a buoy and a committee boat, marking at least one of the start line and the finish line of a sailboat race, said position management system comprising:

first and second global positioning system (GPS) receivers for installation respectively on a selected buoy and a committee boat marking at least one of the start line and the finish line of a sailboat race, said first and second GPS receivers each capable of producing position information of GPS receiver position based upon respectively received GPS satellite transmissions;

at least a single third global positioning system (GPS) receiver for respective installation on at least one sailboat sailing in a sailrace having at least one of a start line and a finish line defined by the selected buoy and the committee boat, said third GPS receiver capable of producing position information of said at least a single third GPS receiver position based upon respectively received GPS satellite transmissions;

first and second radio transmitter circuitry respectively installed on said selected buoy and said committee boat and respectively connected to said first and second GPS receivers for repetitive broadcasting of updated position information based upon the instantaneous position of said respective first and second GPS receivers;

a radio receiver disposed on each respective sailboat having at least a single third GPS receiver installed thereon for receiving said updated position information from said first and second radio transmitters; and a data processing unit connected to said third GPS receiver and said radio receiver for receiving said updated position information, calculating relative position data therefrom, and integrating updated position information from said first, second, and all third GPS receivers to produce updated relative position information with respect to said first, second, and third GPS receivers, said updated position information being provided at a frequency sufficient to enable real-time determination of start line and finish line relative positions, and to enable race course management.

11. A system for assisting in racing across a start line or a finish line, said system comprising:

a plurality of global positioning system (GPS) receivers for installation on selected marker buoys and boats for defining at least one of a start line and a finish line, said plurality of GPS receivers each capable of producing positioning information indicating the respective positions of each of said plurality of GPS receivers based upon respectively received GPS satellite transmissions;

a plurality of transmitter radio modems respectively connected to said plurality of GPS receivers, for respectively converting positioning information produced by respective ones of said plurality of GPS receivers into radio signal transmittable form;

a plurality of radio transmitters connected to respective ones of said plurality of GPS transmitter radio modems, said plurality of radio transmitters configured to broadcast received radio transmittable positioning indications of the updated positions of said plurality of GPS receivers;

at least a single third global positioning system (GPS) receiver for installation on respective ones of selected sailboats, said at least a single third GPS receiver being capable of producing global positioning indications of the position of said third GPS receiver based upon received GPS satellite transmissions;

a corresponding at least a single receiver antenna mounted on each of selected sailboats for receiving positioning indications of the respective positions of said plurality of GPS receivers from respective ones of said plurality of radio transmitters;

a corresponding at least a single radio receiver connected to each said receiver antenna for receiving positioning indications of the positions of said plurality of GPS receivers from corresponding receiver antenna;

a corresponding at least a single receiver modem connected to each said radio receiver; and a corresponding at least a single data processor connected to each said third GPS receiver and each of said corresponding receiver modems, said at least a single data processor calculating relative position information to determine at least one of a relative distance to a race start line and a race finish line based upon the positions of said plurality of GPS receivers.

* * * * *